US007555377B2

(12) United States Patent
Larsson et al.

(10) Patent No.: US 7,555,377 B2
(45) Date of Patent: Jun. 30, 2009

(54) METHOD FOR COLLECTING DATA FROM A MOTOR-DRIVEN VEHICLE

(75) Inventors: Johan Larsson, Stenungsund (SE); Daniel Johansson, Karna (SE); Bo Hammerlid, Greensboro, NC (US)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/905,261

(22) Filed: Dec. 22, 2004

(65) Prior Publication Data

US 2005/0083599 A1 Apr. 21, 2005

Related U.S. Application Data

(63) Continuation of application No. PCT/SE03/00945, filed on Jun. 6, 2003, now abandoned.

(30) Foreign Application Priority Data

Jun. 24, 2002 (SE) .................................... 0201952

(51) Int. Cl.
*G01M 17/00* (2006.01)

(52) U.S. Cl. ............................. 701/35; 701/29; 701/33; 340/438

(58) Field of Classification Search ................... 701/29, 701/33, 34, 35, 39; 340/425.5, 438, 439; 360/70
See application file for complete search history.

(56) References Cited

U.S. PATENT DOCUMENTS

| | | | | |
|---|---|---|---|---|
| 4,258,421 | A | 3/1981 | Juhasz et al. | 701/35 |
| 5,468,042 | A * | 11/1995 | Heinrichs et al. | 296/146.4 |
| 5,638,273 | A | 6/1997 | Coiner et al. | 701/35 |
| 5,737,215 | A | 4/1998 | Schricker et al. | 701/35 |
| 6,002,973 | A | 12/1999 | Giegold | 701/35 |
| 6,434,458 | B1 | 8/2002 | Laguer-Diaz et al. | 701/35 |
| 6,757,665 | B1 * | 6/2004 | Unsworth et al. | 706/15 |

FOREIGN PATENT DOCUMENTS

GB 2043310 A 10/1980

* cited by examiner

*Primary Examiner*—Gertrude Arthur Jeanglaud
(74) *Attorney, Agent, or Firm*—Novak Druce + Quigg LLP

(57) ABSTRACT

Method for collecting data from a motor-driven vehicle that is provided with a microprocessor having memory for storing a particular quantity of data. The data is provided by a number of sensors connected to the vehicle and its motor and is recorded and compiled into a specific data file upon each recording occasion when it its ascertained that conditions are fulfilled for recording a data file. This is recorded as a non-erasable reference data file. Upon subsequent occasions when the conditions are fulfilled, a number of successively erasable data files are successively recorded and stored within the predetermined quantity of data.

9 Claims, 1 Drawing Sheet

METHOD FOR COLLECTING DATA FROM A MOTOR-DRIVEN VEHICLE

CROSS-REFERENCE TO RELATED APPLICATIONS

The present application is a continuation patent application of International Application No. PCT/SE03/00945 filed 6 Jun. 2003 which was published in English pursuant to Article 21(2) of the Patent Cooperation Treaty, and which claims priority to Swedish Application No. 0201952-9 filed 24 Jun. 2002. Said applications are expressly incorporated herein by reference in their entireties.

FIELD OF THE INVENTION

The present invention relates to a method for collecting data from a motor-driven vehicle that is provided with a microprocessor having memory for storing a particular quantity of data, the data being provided by a number of sensors connected to the vehicle and its motor, and that data being recorded and compiled into a specific data file upon each recording occasion.

BACKGROUND OF THE INVENTION

With modern vehicles, faultfinding, for example in the event of a breakdown, can be difficult and time-consuming. At the same time, questions can arise concerning guarantees and whether the vehicle has been used correctly or whether the vehicle has been tampered with in any way by the user. In addition, it can be advantageous to be able to ascertain quickly whether the replacement of a vital component, such as a turbo-compressor, has resulted in a problem's resolution.

These problems occur in particular with heavy vehicles such as tractor-trailer trucks (lorries) used for long-distance transportation, and which are therefore subject to intensive use. In addition, these vehicles are optimized for being used within power ranges that are relatively close to the maximum power. Very high demands are also made regarding fuel economy for these vehicles.

There is thus a need for systems and methods to continually record engine data. An example of a known system for this purpose is a system that continually logs data until a memory unit is full, and after which the oldest recording in the memory unit is successively overwritten. In this manner, historical data is available going back over a certain period of time. The length of this period of time is determined by the storage capacity of the memory unit, but it is economically advantageous if this capacity can be reduced.

DISCLOSURE OF INVENTION

An object of the invention is therefore to achieve a method for collecting data from a motor-driven vehicle, which method makes possible a cost-effective and efficient system solution.

For this object, the method according to the invention is characterized by the steps of ascertaining that conditions are fulfilled for recording a data file, of recording a data file as a non-erasable reference data file, and, on subsequent occasions when the conditions are fulfilled, of successively recording and storing a number of successively erasable data files within the predetermined quantity of data. As a result of designing the method in this way, the quantity of data contains both non-erasable reference data and erasable logging data, which means that the system solution can be made very cost-effective.

BRIEF DESCRIPTION OF DRAWINGS

The invention will be described in greater detail in the following, with reference to embodiments that are shown in the accompanying drawings, and in which.

MODES FOR CARRYING OUT THE INVENTION

Figure 1:
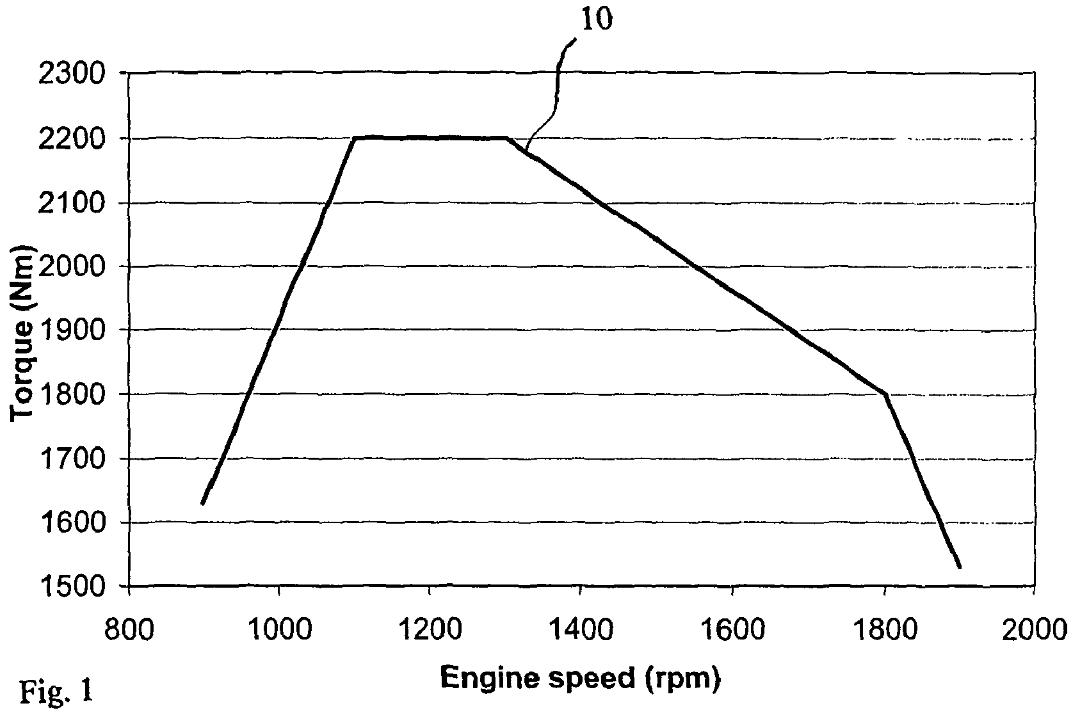
FIG. 1 is a diagram that shows a torque graph for a motor.

The method according to the invention is intended to be used for recording status information comprising a number of operational parameters for a driving motor mounted in a vehicle. These operational parameters can vary, for example depending upon the type of motor that the method is used with, the area of use of the motor, and depending upon what information is available. Thus, the development of new types of sensors can open up new possibilities regarding information about the status of a motor. In addition, new legislation can result in new operational parameters needing to be added. The following embodiment thus contains only one example of what such status information can constitute.

The status information recorded on one and the same occasion can, for example, comprise the following operational parameters: cooling fan speed, vehicle speed, accelerator position, engine load, fuel supply pressure, oil pressure, turbocharger pressure, turbo temperature, ambient air pressure, coolant temperature, crankcase pressure, incoming air temperature, oil temperature, fuel load, engine speed, exhaust gas recirculation (EGR), total distance driven and total running time for the motor.

This status information can be used to determine the condition of the motor and to study the historical trends during the life of the motor. An electronic diagnostic tool can be used for reading off and processing status information before this is presented to the user.

In this embodiment, there are four different events that cause a recording of status information to be carried out. After each of these events, a recording is carried out as soon as all the recording conditions are fulfilled. The status information is stored either in a rolling register or in a special memory, depending upon the event that caused the recording to be carried out. The memory structure can be designed in the following way:

| | |
|---|---|
| Memory for special status recordings | First status recording |
| | Status recording after a certain period of time |
| | Component replacement 1 |
| | Component replacement 2 |
| Rolling register for normal status recordings | Number 1 |
| | Number 2 |
| | — |
| | Number 15 |

The first status recording is carried out when the motor is brand new and when all conditions for recording are fulfilled for the first time. This recording is never overwritten.

The second status recording is carried out after the motor has been running for a particular number of hours, corresponding to the motor's normal break-in (running-in) period. This recording is also never overwritten.

Use of the two remaining memory entries within the memory for special status recordings can be instigated via an electronic diagnostic tool in the event of a replacement of a vital component in the motor, for example in the event of a replacement of the turbo unit. These instigated recordings can be overwritten on a rolling basis. Instigated status recordings are carried out as soon as all the conditions for recording are fulfilled.

The normal register for status recording contains in this embodiment 15 memory entries, which are overwritten on a rolling basis with a suitable minimum interval of time. Time-activated status recording or fault-finding recording with a diagnostic tool is carried out as soon as all the conditions for recording are fulfilled. In order that the different operational parameters in a status recording can contain relevant and repeatable data, a plurality of preconditions needs to be fulfilled before instigated or time-activated status recording can be carried out. For example, the sensors that are included in the recording conditions must be working properly. In addition, it is a condition that the motor not be in so-called motor protection mode.

Assuming that these preconditions are fulfilled and that the status recording is either instigated or time-activated, further conditions for the status recording need to be fulfilled. For example, the motor's coolant temperature must be within a particular range, the engine load must be high (close to maximum torque) or have a high torque requirement, the air pressure must be normal, motor protection mode must not be activated and the engine speed must be decreasing within a specific engine speed range.

The condition concerning the engine load means that the engine load must have been high for a particular period of time, for example, a few seconds. If the motor is not "healthy", it is possible that a system for reducing emissions will limit the torque when the torque requirement is high.

Figure 2:
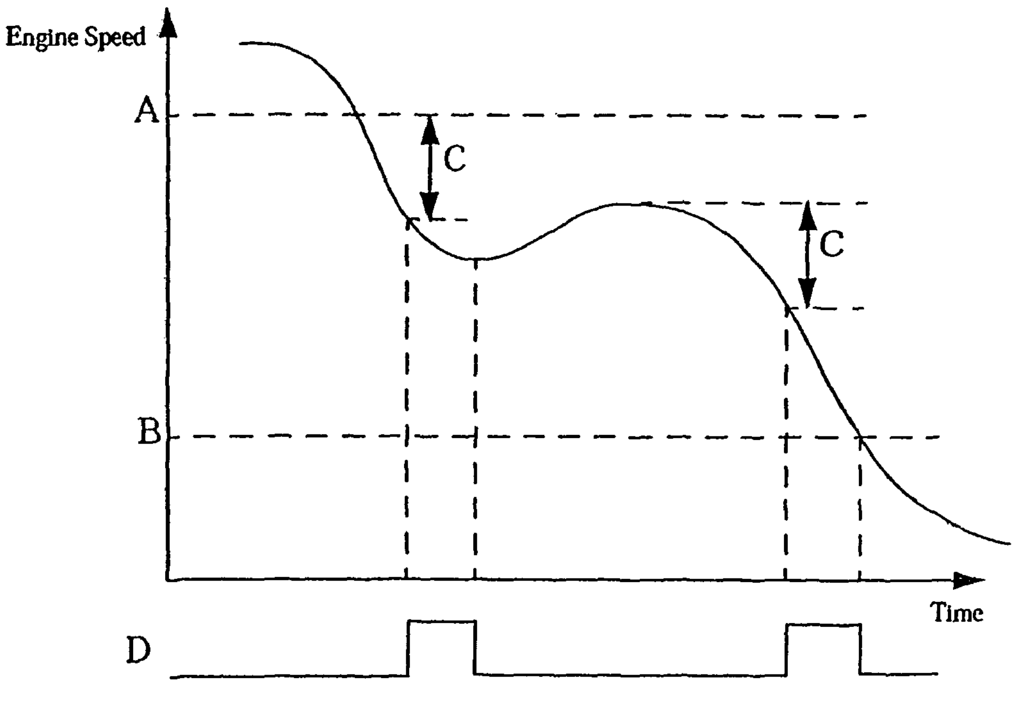
FIG. 2 is a diagram that illustrates a scenario of change in engine speed over time that is a condition for recording.

The condition concerning decreasing engine speed is only tested if the other conditions are fulfilled and occurs when the engine speed decreases within an engine speed range. If the engine speed increases within the range, the conditions will immediately become invalid as depicted in FIG. 2.

FIG. 1 is a diagram charting engine speed on the X-axis and torque on the Y-axis, and demonstrates a conventional torque graph 10 for a combustion engine. FIG. 2 illustrates the relationship of change in engine speed over time which is a condition for recording when the engine speed decreases by a particular number of rpm, C, within an engine speed range A-B.

This is to assure that the engine is running at full load which in turn assures conformity in data collection. D shows the fulfilling of the condition over time.

An electronic diagnostic tool that can be connected to the vehicle's data system can be used to instigate a recording of a data file when the conditions are fulfilled. This is used in particular when fault detection (fault-finding) is performed on the vehicle.

The invention is not to be regarded as being limited to the embodiments described above; a number of further developments and modifications being possible within the framework of the following patent claims.

What is claimed is:

1. A method for collecting data from a motor-driven vehicle including a microprocessor with memory having a capacity for storing a particular quantity of data, said method comprising:

ascertaining that prescribed conditions are fulfilled for recording data of interest;

collecting data from a plurality of sensors connected to the vehicle or motor of the vehicle when the prescribed conditions are fulfilled;

recording prescribed data sets of collected data in the memory as data files, at least one of the data files being stored as a non-erasable reference data file and a plurality of data files recorded thereafter being stored as erasable data files; and analyzing one of said plurality of erasable data files by comparison to said stored, non-erasable reference data file and thereafter recording over said analyzed erasable data file with a new data file to be compared with said reference data file and thereby enabling the utilization of a microprocessor having memory capacity for storing a plurality of historical data files, as well as analyze data in quantities greater than said memory capacity.

2. The method as recited in claim 1, wherein the step of recording the reference data file is performed when the vehicle is substantially newly manufactured.

3. The method as recited in claim 1, further comprising recording an additional non-erasable reference data file is performed during a break-in period of the vehicle.

4. The method as recited in claim 1, further comprising recording an additional non-erasable reference data file is performed immediately subsequent to completion of a break-in period of the vehicle.

5. The method as recited in claim 1, wherein the step of recording the reference data file is performed immediately subsequent to the vehicle undergoing replacement of a vital motor component.

6. The method as recited in claim 5, wherein an erasable data file is recorded at least when the vehicle undergoes replacement of a motor component after the replacement of the vital motor component.

7. The method as recited in claim 5, wherein an additional erasable data file is recorded after the vehicle undergoes each of a plurality of replacements of motor components after the replacement of the vital motor component.

8. The method as recited in claim 1, wherein the data set of each data file comprises calculated and estimated data.

9. The method as recited in claim 1, further comprising instigating recordation of a data file using a diagnostic tool when fault-finding on the vehicle.

* * * * *